C. A. AND E. B. WISE
TRACTOR HITCH.
APPLICATION FILED SEPT. 11, 1918.

1,392,864.

Patented Oct. 4, 1921.

Witness
J. T. L. Wright

Inventor
Charles A. Wise
Elmer B. Wise

By Victor J. Evans
Attorney

UNITED STATES PATENT OFFICE.

CHARLES A. WISE AND ELMER B. WISE, OF LAWRENCE, KANSAS.

TRACTOR-HITCH.

1,392,864.     Specification of Letters Patent.     Patented Oct. 4, 1921.

Application filed September 11, 1918. Serial No. 253,583.

*To all whom it may concern:*

Be it known that we, CHARLES A. WISE and ELMER B. WISE, citizens of the United States, residing at Lawrence, in the county of Douglas and State of Kansas, have invented new and useful Improvements in a Tractor-Hitch, of which the following is a specification.

This invention relates to a tractor hitch, and the object is to provide a device of the type indicated whereby a binder or other similar machine drawn by a tractor may be more readily handled when turning corners in the field.

A further object is to provide a tractor of certain novel construction and including an element extending transversely of the line of draft and at a sufficient angle of inclination to permit the connecting device between the tractor and binder or other machine, to move laterally from the direct line of draft, giving sufficient play to permit of making an easy turn, the inclination of the transverse element effecting the return of the connecting device to a position in the line of normal draft when the tractor proceeds on a straight course.

With the foregoing and other objects in view, the invention consists in the novel construction, combination and arrangement of elements hereinafter described and claimed.

Figure 1:
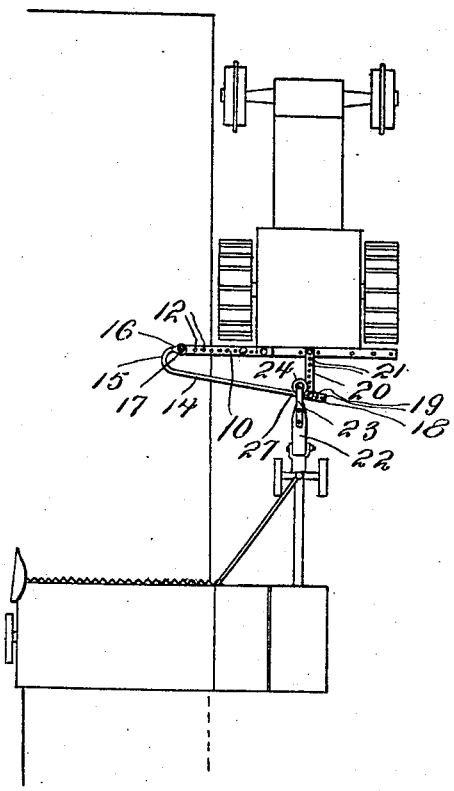
Figure 2:
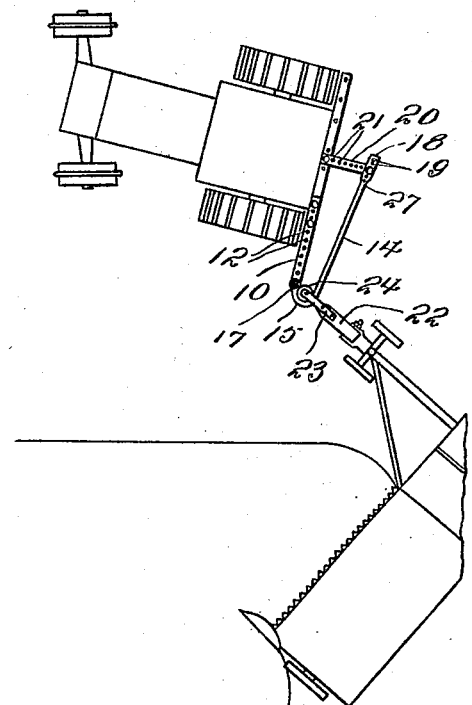
Figure 3:
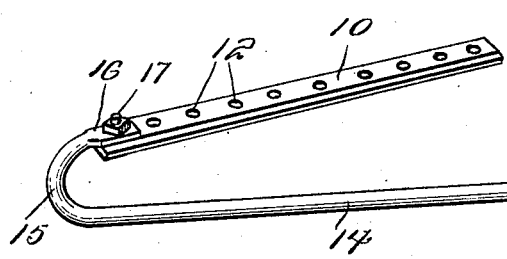
Figure 3:
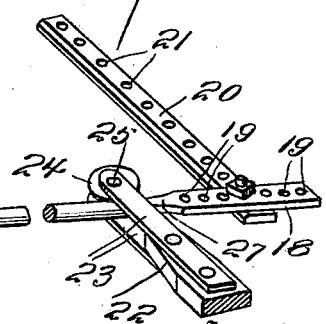

In the drawings, Figure 1 shows the device in top plan, in operative position; Fig. 2 also shows the device in plan view, the tractor and machine being drawn being in different relative positions; Fig. 3 is a detached view of the hitch, on an enlarged scale.

In carrying out our invention we provide a bar 10 extending transversely with reference to the rear portion of the tractor and which may be of any suitable length, this bar being provided with a series of apertures 12 for effecting the necessary adjustment thereof. Connected with this bar is a bar 14, the major portion of which is cylindrical in cross section, one end being deflected as shown at 15 to form a U-shaped element and being provided with a flattened end 16 having an aperture through which a bolt 17 passes for connecting the bars 14 and 10.

Bar 14 extends transversely with reference to the line of draft, but not perpendicularly, having a given inclination depending upon the requirements in a particular instance. This bar 14 is provided with flattened portion 18 at one end, the portion last named having a series of apertures 19 therein permitting of adjustment with reference to the draw bar 20, the latter having a series of apertures 21. The draw bar is secured to the tractor in the direct line of normal draft.

The stub tongue 22 of the binder truck is provided with a plurality of spaced bars such as 23 between the ends of which a grooved wheel 24 is mounted on a pin 25. This wheel 24 is adapted to roll along one edge of bar 14, and when the tractor is proceeding in a straight course wheel 24 will be drawn into engagement with bar 20, so that the draft will be direct.

When a turn is to be made at the corner of the field, the position of the tractor in making the turn will be such that the tongue 22 will move laterally or from one end of bar 14 toward the outer end thereof, the wheel 24 finally resting within the deflected portion of the bar 14. The lateral movement thus produced may be some five or six feet, giving that amount of play and facilitating the turning operation, giving the binder truck the required angle almost immediately. When the tractor resumes a straight course, the tongue 22 will move toward the end 27 of the bar 14 until the wheel 24 is again in contact with bar 20, this operation being effected without manual assistance. The angle of inclination of bar 14 is adjusted according to circumstances, as previously indicated.

What is claimed is:

A tractor hitch comprising a bar to be mounted on the rear portion of a tractor and transversely thereof, a draw-bar extending rearwardly from the first named bar, a third bar extending from one end of the bar first named to the outer end of the draw-bar and connected with the elements last named, a device for connection with the machine to be drawn and including a wheel engaging and movable along the third bar, said third bar including a U-shaped element proportioned to receive the wheel and retain it in operative position, the curve of the U element being approximately equivalent to one-half of the circumference of the wheel and said element, permitting draft in the direction required for turning corners, and means for varying the extent of travel of the wheel and draw bar along the third bar, and varying the angle between the latter and the bar first named thereby governing the return of the draw bar to normal position.

In testimony whereof we affix our signatures.

CHARLES A. WISE.
ELMER B. WISE.